Sept. 28, 1943. I. W. ENGLAND ET AL 2,330,207
METHOD OF MAKING SHEET METAL CONTAINERS
Filed Jan. 22, 1941 2 Sheets-Sheet 1
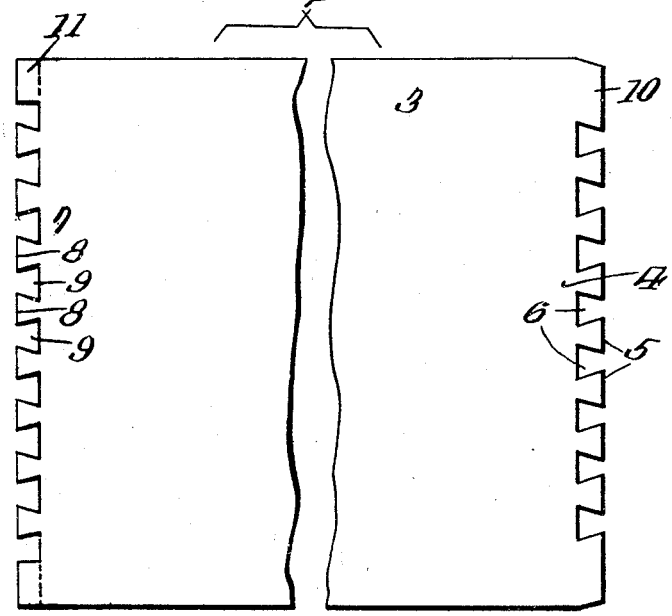
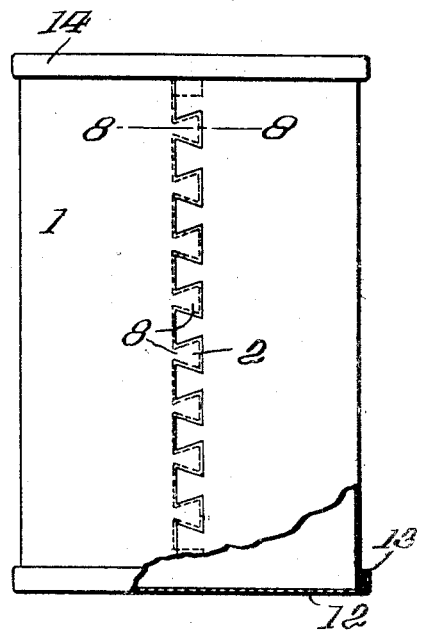
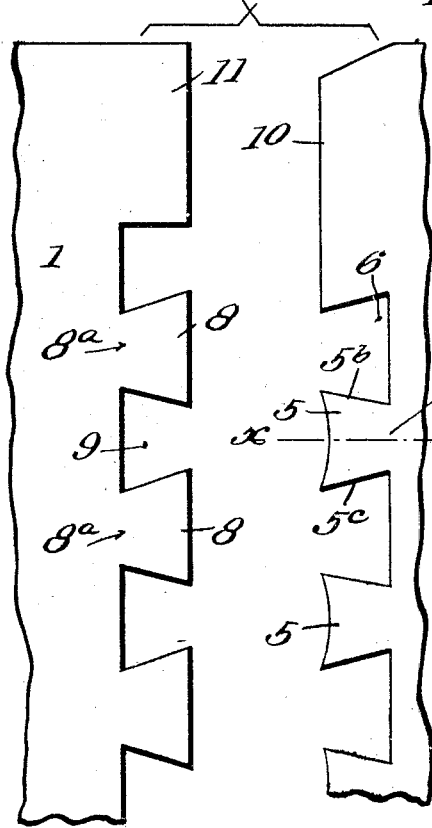
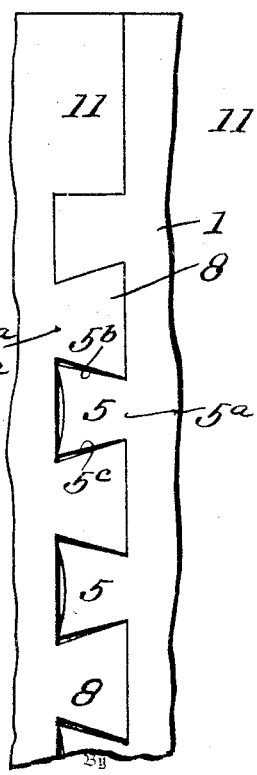
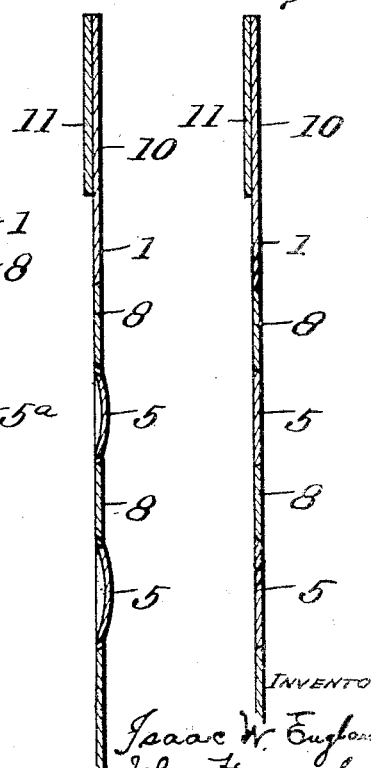

Sept. 28, 1943.   I. W. ENGLAND ET AL   2,330,207
METHOD OF MAKING SHEET METAL CONTAINERS
Filed Jan. 22, 1941    2 Sheets-Sheet 2
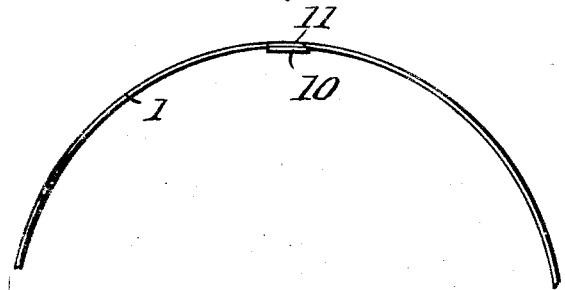
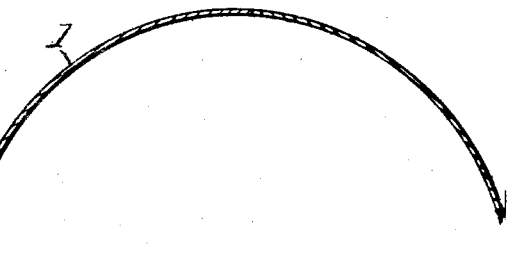
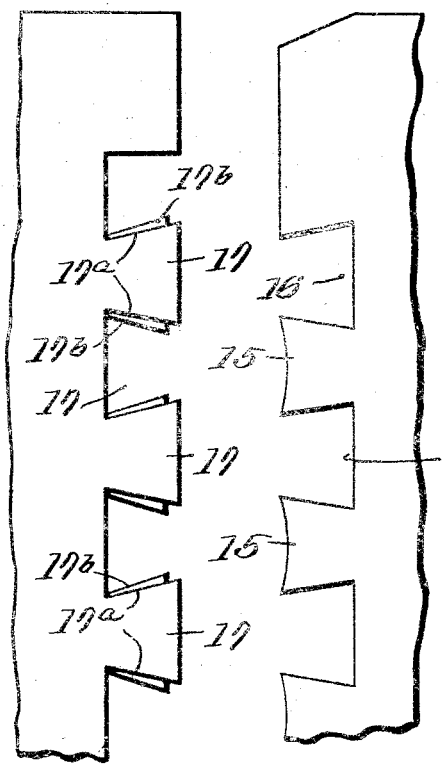
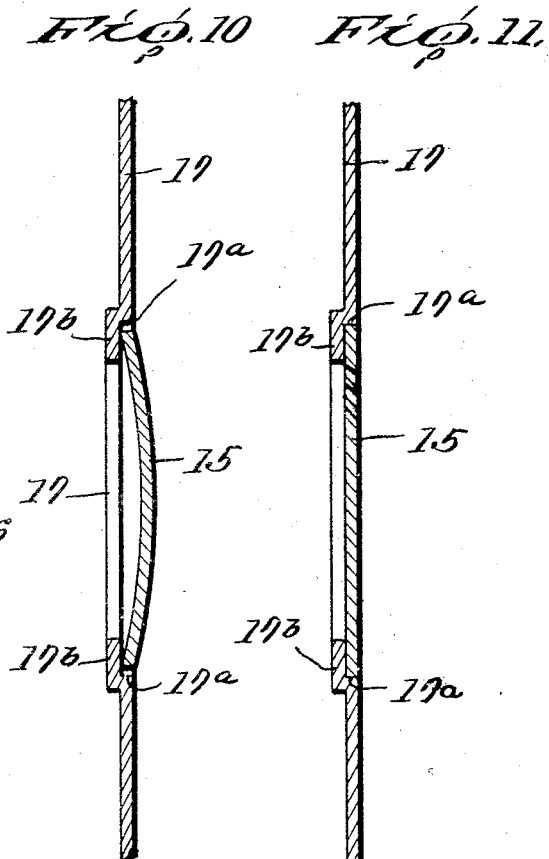

Patented Sept. 28, 1943

2,330,207

UNITED STATES PATENT OFFICE 2,330,207

METHOD OF MAKING SHEET METAL CONTAINERS

Isaac W. England and John Haycock, New York, N. Y., assignors to Continental Can Company, Inc., New York, N. Y., a corporation of New York Application January 22, 1941, Serial No. 375,520

2 Claims. (Cl. 113—120)

The invention relates to new and useful improvements in the method of making a sheet metal container, and more particularly to the method of producing the side beam of a sheet metal container.

An object of the invention is to provide a method of making a side seam for a sheet metal container wherein the end portions of the seam in the region where the flanges are formed for double-seaming are lapped, and wherein the seam throughout the remainder of its extent has the edges thereof abutted and mechanically interlocked as well as bonded by metal.

A further object of the invention is to provide a method of forming a seam for the parts of a sheet metal container whereby the connected edge portions are abutted and mechanically interlocked by projections fitting within recesses, with the edges of the projections forced into intimate contact with the edges of the recesses.

A still further object of the invention is to provide a method of producing a side seam for sheet metal can bodies wherein the edge portions are abutted and mechanically interlocked by projections fitting within recesses, which projections are slightly larger than the recesses and are forced into the recesses to bring the edges into intimate contact so as to prevent distortion of the parts when heated for bonding and for facilitating the uniting of the parts by metal bonding.

These and other objects will in part be obvious and will in part be hereinafter more fully disclosed.

In the drawings—

Figure 1 is a view of a blank which has been notched and shaped at the edge portions for the forming of the can body;

Fig. 2 is a side view of a completed can body;

Fig. 3 is a detail on an enlarged scale showing the edge portions shaped for interlocking before they are assembled;

Fig. 4 is a view similar to Figure 3, but showing the parts assembled ready for bumping;

Fig. 5 is a sectional view on the line 5—5 of Figure 4;

Figure 6 is a view similar to Figure 5, showing the seam bumped and the edges of the projections forced into intimate contact with the edges of the recesses;

Fig. 7 is an end view of the side seam of the completed body before flanging;

Fig. 8 is a section on the line 8—8 of Figure 2;

Fig. 9 is a detail similar to Figure 3, showing a slightly modified form of the invention;

Fig. 10 is a sectional view longitudinally of the seam showing the parts assembled ready for bumping, and Fig. 11 is a view similar to Figure 10, showing the parts bumped and ready for bonding.

The invention is illustrated in the drawings as applied to the side seam of a can body. The completed can body is indicated at 1 in Figure 2, and the side seam joining the edges thereof is indicated at 2. The can body is made from a blank of sheet metal indicated at 3 in Figure 1 of the drawings. The edge portion 4 of the blank is provided with a series of spaced projecting portions 5, 5. Between the projecting portions are spaces or recesses 6, 6. At the other edge 7 of the blank are spaced projecting portions 8, 8 between which are recesses 9, 9.

The projecting portions 5, 5 are wider at their outer ends than the neck portion 5a which supports the projection. As shown in the drawings, the sides and end of each projection are straight walls meeting at angles. It is obvious that these projecting portions may be otherwise shaped, but it is essential that the outer free end portion of each projection shall be wider in a direction longitudinally of the seam than the neck portion of the projection which supports the same. The same is true of each projection. It is wider at its outer end than the neck portion 8a which supports the same. The projections 5 are shaped so that when the seam is completed, each projection will completely fill and make abutted contact with the edges of the opposed recess 9. The projection 8 is shaped and disposed so that it will completely fill and make edge contact with the edges of the opposed recess 6 between the projections 5, 5. The projecting portions 5, 5 are initially curved along a line x—x centrally therethrough. This draws the side edge 5b nearer to the side edge 5c and greatly facilitates the placing of the projections 5 in their corresponding recesses 9. After the edges have been brought together and the projections interlocked, as shown in Figures 4 and 5, then the side seam is subjected to a bumping operation of the usual character. This bumping operation consists in the placing of the interlocked edge portions on a bumping anvil or horn, and the striking of the same with a bumping iron which is shaped to conform to the curvature of the body so that when the side seam is bumped, these interlocked projections will lie in the curved plane of the cylindrical body.

It is noted from Figure 5 that the edge portions of the projections are inclined to the plane of the edge portion instead of at right angles thereto. This faciltates the bringing of the edge portion into abutted relation and extends slightly the length of the abutted engagement for a given thickness of metal.

The interlocked portions just described do not extend the complete length of the side seam, but at each end of the side seam the blanks are so shaped as to overlap, as clearly shown in Figures 3 to 6. In Figure 3, the outer lapping portion at the upper end of the seam is indicated at 10 and the inner lapping portion at 11. When the seam is bumped, these lapping portions are curved and brought into close contact with each other. The bumping of the seam causes the projecting portions which are initially curved to straighten out and make very tight intimate contact with the edges of the recesses in which they are disposed. This will firmly hold the edges of the blank interlocked preparatory to the solder bonding of the side seam. When solder is applied, the edge portions will be united with the solder bond, and the lapping portions will also be solder-bonded so that the seam is a complete hermetic seam from one end to the other thereof. It is noted that throughout the interlock, there is an edge abutted contact which is continuous and unbroken.

While the seam is described as solder-bonded, it is understood that it might be welded or otherwise metal bonded for making a tight strong joint.

If the can body is made of tin plate, the raw edges of the metal which are exposed during the shaping of the edge portions for uniting, will be completely concealed within the side seam. It is further noted that in the finished side seam, the mechanically interlocked parts all lie in the curved plane of the body of the container, and therefore, the container may be very readily lacquered or coated with wax or any other desired non-metallic coating, both inside or outside, and a very uniform thickness of coating obtained, not only throughout the region of the body, but also in the region of the side seam.

After the can body is made up in the manner described above, the body is flanged in the usual way and a bottom end 12 is joined thereto by a double seam 13. After filling, a top end 14 may be seamed to the body in the usual way. While the seam is shown as applied to what is usually referred to as a "packer's container" where the end is seamed to the body after the container is filled, it will be understood that this side seam may be applied to any type of container made of sheet metal.

The invention not only resides in the article produced, but in the method of making the side seam, which includes the steps of shaping the edge portions to form the interlocking projections, curving certain of the projections to facilitate the assembling of the same, and then the bumping of the interlocked projections and the applying of a metal bond for completing the seam.

In Figures 9 to 11 there is shown a slightly modified form of the invention. The body blank is provided with projecting portions 15, 15 between which are spaces or recesses 16, 16. These projecting portions are initially curved in the manner described in connection with the projections 5. The other edge portion of the blank is provided with projecting portions 17, the edges 17a of which are formed with integral projecting offset ledges or lugs 17b. These ledges or lugs 17b are formed on the projecting portion 17 at the time of cutting the blank to shape said projections. Sufficient metal is left along the edges of the projections 17 to form these ledges or lugs and by a die-shaping operation they are offset from the plane of the blank, as shown in Figures 10 and 11. When the projection 15 is placed in the opposed recess between adjacent projections 17, said portion 15 will rest on these ledges or lugs 17b, 17b, (see Figure 10). This will support and maintain the alignment of the projections preparatory to bumping. After the side seam is bumped, then the edges of the projection 15 will be brought into intimate contact with the shoulders 17a on the projections 17.

The method of making the side seam shown in the modified form of construction is similar to that described above. The edges are prepared by forming the projections with the supporting ledges, and the curving of the projections which are to fit into the recesses and rest on the ledges. Then the edge portions of the blank are brought together over a cylindrical bumping horn, and the seam parts locked together on the anvi' of the bumping horn. The bumping iron contacts with these projections throughout the length of the side seam and forces the curved projections into the curved path of the can body and the edges thereof into contact with the shoulders surrounding the recess receiving the projection. After the side seam is bumped, then it is solder-bonded or otherwise metal bonded, and this produces an hermetically closed side seam wherein the edge portions are mechanically locked, and wherein the adjacent edges of the interlocked parts form one continuous metal-bonded line.

In carrying out the method producing the seam described, the blanks are first fed to a means for cleaning the scale and any collecting films from the edge portions which are to be joined; then they are cut and the edges shaped for joining, after which the blank is shaped into the form of a can body when a side seam is being made and the edge portions interlocked and bumped. The next step consists in either solder-bonding the mechanically joined edges or welding the edge portions for metal-bonding the same and finishing the seam. In soldering, it is essential that the edges after they are cut and shaped shall be joined before the metal oxidizes. When the joining follows immediately after the cutting, clean surfaces are presented for joining, and this makes a very effective solder bond. The same is true, to a large extent, in connection with welding; the clean surfaces will be joined by welding much more efficiently. When a supporting ledge is provided as shown in Figure 10, the edge portions to be joined are not only brought into perfect alignment, but the surface to be joined by metal-bonding is extended so as to make a very efficient joint.

It is obvious that many changes may be made in the shaping of the parts without departing from the spirit of the invention as set forth in the appended claims. It is also obvious that the seam which is described and illustrated as a side seam for container bodies may be used in connection with the joining of metal parts in containers wherever such a seam is applicable.

Having thus described the invention, what we claim as new and desire to secure by Letters Patent, is:

1. The method of making a side seam for a sheet metal can body, comprising shaping the body blank so as to provide spaced projecting portions along one edge of the blank, which projecting portions are wider at the free ends thereof than at the portion joining the body blank, and opposed recesses along the other edge of the blank, which recesses are shaped to conform to the projecting portions, curving the projecting portions transversely of the center line thereof so as to reduce the over-all area of the projections to facilitate the insertion of the same in the respective recesses on the other edge portion of the blank, placing the curved portions in the said recesses, bumping the side seam so as to straighten out the curvature of the projecting portions and bring the edges thereof into intimate contact with the edges of the recesses, and metal-bonding the side seam for hermetically uniting the contacting edges.

2. The method of making a side seam for a sheet metal can body comprising shaping the body so as to provide spaced projecting portions along one edge of the blank and opposed recesses along the other edge of the blank, said recesses conforming in shape to the projections, offsetting the metal at the side edges of each recess to form projecting lugs; curving the projections on the edge of the body blank transversely of the center line thereof so as to reduce the over-all area of the projections to facilitate the insertion of the same in the respective recesses on the other edge portion, placing the projections in the recesses on the supporting lugs therefor, bumping the side seam to straighten out the curvature of the projecting portions for bringing the adjacent parts of the projections and recesses into intimate contact and metal-bonding the side seam for hermetically uniting said contacting edge portions.

ISAAC W. ENGLAND.
JOHN HAYCOCK.